United States Patent
Zhang et al.

(10) Patent No.: US 9,924,388 B2
(45) Date of Patent: Mar. 20, 2018

(54) AUTONOMOUS DETECTING AND POSITIONING METHOD OF INDOOR WIRELESS NETWORK FAULTS

(71) Applicant: RANPLAN WIRELESS NETWORK DESIGN LTD, Cambridge (GB)

(72) Inventors: Jie Zhang, Luton (GB); Hui Song, Hertford (GB); Chunxia Qin, Jinan (CN)

(73) Assignee: Ranplan Wireless Network Design Ltd, Cambridge (GB)

(*) Notice: Subject to any disclaimer, the term of this patent is extended or adjusted under 35 U.S.C. 154(b) by 0 days.

(21) Appl. No.: 15/108,214

(22) PCT Filed: Dec. 24, 2014

(86) PCT No.: PCT/GB2014/053848
§ 371 (c)(1),
(2) Date: Jun. 24, 2016

(87) PCT Pub. No.: WO2015/097482
PCT Pub. Date: Jul. 2, 2015

(65) Prior Publication Data
US 2016/0323760 A1 Nov. 3, 2016

(30) Foreign Application Priority Data
Dec. 24, 2013 (CN) .......................... 2013 1 0721807

(51) Int. Cl.
*H04W 24/06* (2009.01)
*H04B 17/318* (2015.01)
(Continued)

(52) U.S. Cl.
CPC .......... *H04W 24/06* (2013.01); *H04B 17/318* (2015.01); *H04W 64/003* (2013.01); *H04W 16/20* (2013.01); *H04W 84/10* (2013.01)

(58) Field of Classification Search
CPC ... H04W 24/06; H04W 64/003; H04W 84/10; H04W 16/20; H04B 17/318
See application file for complete search history.

(56) References Cited

U.S. PATENT DOCUMENTS

| 2004/0236547 A1 | 11/2004 | Rappaport et al. |
| 2005/0265321 A1 | 12/2005 | Rappaport et al. |

(Continued)

FOREIGN PATENT DOCUMENTS

| CN | 101431764 A | 5/2009 |
| CN | 101547506 A | 9/2009 |

(Continued)

OTHER PUBLICATIONS

Fortune, Steven, "A Bream-Tracing Algorithm for Prediction of Indoor Radio Propagation," Applied Computational Geometry Towards Geometric Engineering, Springer Berlin Heidelberg, May 27, 1996, pp. 157-166.

(Continued)

*Primary Examiner* — Kamran Afshar
*Assistant Examiner* — Minjung Kim
(74) *Attorney, Agent, or Firm* — Mintz Levin Cohn Ferris Glovsky and Popeo, P.C.

(57) ABSTRACT

Method of autonomous detection and positioning method of indoor wireless network faults, the method comprising: building an indoor three-dimensional spatial structural model and an indoor transmitting antenna model of a target building, calculating the signal strength of the indoor transmitting antenna model inside the target building according to a ray-tracing propagation model algorithm to determine key testing positions of the target building, each key test position being associated to an individual transmitting antenna and maximizing the difference between the signal strength generated by its corresponding antenna and that (Continued)

generated by other antennas, deploying mobile phones with an automatic dial testing function at the key testing positions of indoor wireless networks and starting the dial testing mobile phones when the wireless networks are idle, collecting measurement reports reported by the dial testing mobile phones, detecting and locating faults of indoor networks and devices according to the measurement reports.

10 Claims, 3 Drawing Sheets

(51) Int. Cl.
*H04W 64/00* (2009.01)
*H04W 16/20* (2009.01)
*H04W 84/10* (2009.01)

(56) References Cited

U.S. PATENT DOCUMENTS

| | | | |
|---|---|---|---|
| 2008/0057873 | A1 | 3/2008 | Huang et al. |
| 2011/0311436 | A1 | 12/2011 | Yura et al. |
| 2013/0337824 | A1 | 12/2013 | Meredith et al. |
| 2014/0213298 | A1 | 7/2014 | Marti et al. |
| 2015/0011239 | A1 | 1/2015 | Quan et al. |

FOREIGN PATENT DOCUMENTS

| | | |
|---|---|---|
| CN | 101883424 A | 11/2010 |
| CN | 102143511 A | 8/2011 |
| CN | 102480678 A | 5/2012 |
| CN | 202231869 U | 5/2012 |
| CN | 202940968 U | 5/2013 |
| CN | 103369549 A | 10/2013 |
| CN | 103440473 A | 12/2013 |
| WO | WO-2011/067466 A1 | 6/2011 |

OTHER PUBLICATIONS

International Search Report dated Apr. 8, 2015 for PCT Application No. PCT/GB2014/053848, filed Dec. 24, 2014, 5 pages.
Chunxia Qin, Dayang Liu, Zhihua Lai, and Jie Zhang. "Analys and Solution for WLAN Wireless Interference Based on Ranplan iBuildNet.", Telecommunications Technology, issue 9, 2011. pp. 127-131. www.ttm.com.cn.
Fang et al., "Dynamic Fingerprinting Combination for Improved Mobile Localization." IEEE Transactions on Wireless Communications, vol. 10, No. 12, Dec. 1, 2011, pp. 40184022.
International Search Report dated Apr. 21, 2015 for PCT Application No. PCT/GB2014/053845, filed Dec. 24, 2014, 5 pages.
Sun et al., "Signal Processing Techniques in Network-Aided Positioning." IEEE Signal Processing Magazine; vol. 22, No. 4; Jul. 1, 2005; pp. 12-23.
The State Intellectual Property Office of China First Notification of Office Action and Search Report issued in Chinese Patent Application No. 201310721807.X, dated Mar. 31, 2016. 8 pages. [Chinese language].
The State Intellectual Property Office of China First Notification of Office Action and Search Report issued in Chinese Patent Application No. 201310721807.X, dated Mar. 31, 2016. 11 pages. [English language translation].
The State Intellectual Property Office of China First Notification of Office Action and Search Report issued in Chinese Patent Application No. 201310724059.0, dated Feb. 6, 2016. 6 pages. [Chinese language].
The State Intellectual Property Office of China First Notification of Office Action and Search Report issued in Chinese Patent Application No. 201310724059.0, dated Feb. 6, 2016. 11 pages. [English language translation].

AUTONOMOUS DETECTING AND POSITIONING METHOD OF INDOOR WIRELESS NETWORK FAULTS

CROSS-REFERENCE TO RELATED APPLICATIONS

This application is a national stage entry, filed under 35 U.S.C. § 371, of International Application No. PCT/GB2014/053848, filed on Dec. 24, 2014, which claims the benefit of and priority to Chinese Patent Application No. 201310721807.X, filed Dec. 24, 2013, the entire contents of each of which are incorporated herein by reference in their entireties and for all purposes.

FIELD OF THE INVENTION

The present invention relates to an autonomous detecting and positioning method of indoor wireless network faults, which belongs to the field of indoor wireless network maintenance of mobile communication field.

BACKGROUND OF THE INVENTION

With the development of wireless communication technology and the increase of indoor data business, indoor wireless signal becomes more and more important, and indoor wireless networks become one of the principle ways to deal with indoor network coverage and shunt, or accept, the user's traffic flow. Therefore, to detect the faults of indoor wireless network devices in time is the premise of ensuring normal operations of the existing wireless communication networks and improving customer satisfaction. Under the current situation, the monitor rate of mobile operators on outdoor active devices can reach above 90%, while the monitor on passive devices of indoor wireless networks is just on its debut. On the one hand, this is due to the late starting of indoor networks relative to outdoor networks, on the other hand, this is also because that it is harder to monitor indoor passive devices, and a simple but effective monitor way is also lacked.

The frequently employed methods to monitor faults of indoor wireless networks mainly include artificial dial testing and periodic inspection, which not only takes a long period of time to inspect, but also cannot discover and locate the faults in time. Hubei Mobile has proposed to achieve the monitoring of faults of indoor passive devices by using a method that intelligently analyses, and positions the passive devices with faults by sensing the intensity of electromagnetic wave radiations of terminal antennas, and applying the technology of ZigBee Internet of things. However, although this method is reliable, it needs to build an additional wireless sensor network which costs a lot.

In conclusion, at present, a technical problem that needs to be solved urgently by persons skilled in the art is: how to achieve automatic detection and rapid positioning of indoor wireless network faults.

SUMMARY OF THE INVENTION

The purpose of the present invention is to solve the above problem, and provides an automatic detecting and positioning method of indoor wireless network faults, which has the advantage of achieving autonomous detecting and positioning of indoor wireless networks faults.

To achieve the above purpose, aspects of the present invention applies the following technical solution:

According to a first aspect of the present invention there is provided an autonomous detecting and positioning method of indoor wireless network faults, the method comprising: building an indoor three-dimensional spatial structural model and an indoor transmitting antenna model of a target building, calculating, in the indoor three-dimensional spatial structural model, the signal strength of the indoor transmitting antenna model inside the target building according to a ray-tracing propagation model algorithm to accordingly determine key testing positions of the target building, deploying mobile phones with an automatic dial testing function at the key testing positions of indoor wireless networks and starting the dial testing mobile phones when the wireless networks are idle, counting on-states of the dial testing mobile phones, collecting measurement reports reported by the dial testing mobile phones, judging faults of indoor networks and devices according to the on-states of the dial testing mobile phones and the measurement report reported by the dial testing mobile phones.

According to a second embodiment of the present invention there is provided a method for autonomous detecting and positioning of indoor wireless network faults, the method comprising: building an indoor three-dimensional spatial structural model and an indoor transmitting antenna model of a target building, calculating, in the indoor three-dimensional spatial structural model, the signal strength of the indoor transmitting antenna model inside the target building according to a ray-tracing propagation model algorithm to accordingly determine key testing positions of the target building, deploying wireless units with an automatic connection testing function at the key testing positions of indoor wireless networks and starting the connection testing wireless units when the wireless networks are idle, counting on-states of the connection testing wireless units, collecting measurement reports reported by the connection testing wireless units, judging faults of indoor networks and devices according to the on-states of the connection testing wireless units and the measurement reports reported by the connection testing wireless units.

An autonomous detecting and positioning method of indoor wireless network faults, the method may comprise the following steps:

step (1): building an indoor three-dimensional spatial structural model and an indoor transmitting antenna model of a target building;

step (2): calculating the signal strength of the indoor transmitting antenna model in step (1) inside the target building by using a ray-tracing propagation model algorithm in the indoor three-dimensional spatial structural model;

step (3): determining key testing positions of the target building and reference signal strength that can be received by the dial testing mobile phones at the key testing positions, based on the calculation results in step (2);

step (4): deploying mobile phones with a timing automatic dial testing function at the key testing positions determined in step (3); the timing automatic dial testing function includes the automatic dial testing time, frequency, target objects or business of the user-defined mobile phones;

step (5): on network side, judging on-states of the dial testing mobile phones, collecting measurement reports reported by the dial testing mobile phones, and extracting respectively the measurement reports of the dial testing mobile phones that correspond to several transmitting antennas according to the automatic dial testing time and indications of the dial testing mobile phones in step (4);

step (6): judging transmitting antennas with faults according to the on-states of several dial testing mobile phones extracted in step (5), the reference signal strength information in the measurement reports, and the reference signal strength that can be received by the dial testing mobile phones at the key testing positions in step (3).

The construction process of the indoor three-dimensional spatial structural model in step (1) may comprise: three-dimensional modelling the CAD format drawings of the target building for each floor respectively, and storing separately the three-dimensional spatial construction data of each floor; the three-dimensional spatial construction data includes the vertical heights of the floors, horizontal areas of the floors, data of the building materials of the floors and data of the layout and structures of the floors.

The construction process of the indoor transmitting antenna model in step (1) may be: recording and storing the data of all transmitting antennas inside the target building; the data of the transmitting antennas includes information of specific locations of the transmitting antenna in the target building and the three-dimensional radiation parameter, power, frequency and angle of the transmitting antenna.

Step (2) may include simulating respectively the signal strength of each of the transmitting antennas in the target building, and the specific procedure of calculating the signal strength using the ray-tracing propagation model algorithm is shown in steps (2-1)-(2-8).

Predicting out the signal strength of one transmitting antenna received at a receive point inside the target building by the ray-tracing propagation model algorithm, and the specific procedure may be as shown in (2-1)-(2-6):

step (2-1): according to the locations of the transmitting antennas and the receive points, determining all propagation paths of rays emitted from the transmitting antennas to the receive point i: N is the total number of the propagation paths from the transmitting antennas to the receive point i;

step (2-2): calculating propagation losses of each of the propagation paths in the free space, wherein the propagation loss value of the kth path in the free space is $L_p(f, d_k)$ ($1 \leq k \leq N$), wherein f is signal frequency (MHz), $d_k$ is the transmission distance (km) of the kth path in the free space; then the loss value (dB) of the kth path in the free space, regardless of transmission, reflection and diffraction, can be calculated by the following formula:

$$L_p(f,d_k) = 20 \log 10(f) + 20 \log 10(d_k) + 32.45$$

step (2-3): calculating the loss of each propagation path under the influence of building materials, wherein $L_{MAT}(f)$ is the total fading of the transmissions, reflections and diffractions caused by the building materials on the kth path; T is the total number of all building materials inside the target building, and the jth material is represented as $M_j$ ($1 \leq j \leq T$), $\delta t$, $\delta d$, $\delta r$ are the correlation coefficients of whether there is transmission, reflection or diffraction between the wireless signal and the building materials on the kth path, $$\delta_t = \begin{cases} 0, & \text{transmission of material } M_j \text{ does not exist} \\ 1, & \text{transmission of material } M_j \text{ exists} \end{cases},$$

$$\delta_d = \begin{cases} 0, & \text{diffraction of material } M_j \text{ does not exist} \\ 1, & \text{diffraction of material } M_j \text{ exists} \end{cases},$$

$$\delta_r = \begin{cases} 0, & \text{reflection of material } M_j \text{ does not exist} \\ 1, & \text{reflection of material } M_j \text{ exists} \end{cases},$$

in the database of the wireless propagation loss parameters of the building materials, $L_t(f,M_j)$, $L_d(f,M_j)$, $L_r(f,M_j)$ are respectively: the loss parameters of transmission, diffraction and reflection of the frequency corresponding to material $M_j$, when the wireless signal frequency is f; then the total fading $L_{MAT}(f)$ of the transmissions, diffractions and reflections caused by the building materials on the kth path is calculated by the following formula:

$$L_{MAT}(f) = \sum_{j=1}^{T} (\delta t * L_t(f, M_j) + \delta d * L_d(f, M_j) + \delta r * L_r(f, M_j))$$

step (2-4): calculating the propagation loss $L(f, d_k)$ of each of the propagation paths with the following formula:

$$L(f,d_k) = L_p(f,d_k) + L_{MAT}(f)$$

step (2-5): calculating the total loss PL(dB) of the propagation paths of N ray propagation paths to the ith point; since the energy of each ray propagation path is in linear relationship, the calculation of the loss of a plurality of propagation paths can start from the superposition of the energy of each ray (mW), followed by taking average and transforming the energy values into path loss values; the calculation formula of PL is as follows:

$$PL = 10 lg \left( \frac{1}{N} \sum_{k=1}^{N} \left( 10^{\frac{L(f,d_k)}{10}} \right) \right),$$

step (2-6): calculating the wireless signal strength at receive point i, assume that $P_i$ is the signal strength (dBm) at the ith receive point; $P_t$ is the transmitting power (dBm) of the wireless signal transmitting antenna; $G_t$ and $G_r$ are respectively the antenna gains (dBi) of the wireless signal transmitting antenna and the receive point, then the signal strength $P_i$ at the ith receive point is calculated by the following formula:

$$P_i = P_t - PL + G_t + G_r$$

step (2-7): selecting all other receive points in the scene, repeating step (2-1) to step (2-6) to accordingly obtain the wireless signal strength of one transmitting antenna at all receive points;

step (2-8): selecting other transmitting antennas of the indoor wireless networks, repeating step (2-1) to step (2-7) to accordingly obtain the wireless signal strength information of each of the wireless transmitting antennas in the scene.

the step (3) may comprise the following steps:

step (3.1): as regards the simulation results in step (2), selecting a horizontal plane at the same height with the transmitting antennas from the floors, sampling the field strength generated by each of the transmitting antennas respectively according to a preset sampling resolution, and storing the sampling results in a database;

assume that the number of the sampling points of the scene is m, wherein n transmitting antennas are provided, which are respectively recorded as Tx1, Tx2, . . . , Txn, then the sampling result is stored as a two-dimensional array of m×n (m lines and n columns); each line of data in the two-dimensional array records the field strengths of n transmitting antennas at one position, and the field strengths of n transmitting antennas at the ith position are recorded as $\overline{E_i} = [E_{i,1}, E_{i,2}, \ldots, E_{i,n}]$, ($1 \leq i \leq m$), each column of data in the array records the field strengths of one transmitting antenna at m positions in the samples respectively, the field strengths of the pth transmitting antenna at m positions respectively are recorded as $[E_{1,p}, E_{2,p}, \ldots, E_{m,p}]^T$; the sampling resolution must ensure that the number of the sampling points m is bigger than the number of the transmitting antennas n (m>n);

step (3.2): processing the data in the sampling results stored in step (3.1), searching n key testing positions from m positions, each of which corresponds to a transmitting antenna, the basis of searching key testing positions is to ensure that the difference between the signal strength generated by the transmitting antenna corresponding to a key testing positions and that generated by other antennas is the biggest, assume that position i is the key testing position of the pth transmitting antenna, then, for any other positions q(1≤q≤m), q≠j, there is:

$$\min\{|E_{i,1}-E_{i,p}|, |E_{i,2}-E_{i,p}|, \ldots, |E_{i,n}-E_{i,p}|\} > \min\{|E_{q,1}-E_{q,p}|, |E_{q,2}-E_{q,p}|, \ldots, |E_{q,n}-E_{q,p}|\}$$

that is, the minimum value of the difference between element $E_{i,p}$ and other elements in $Ei=[E_{i,1}, E_{i,2}, \ldots, E_{i,n}]$ is larger than that between element $E_{q,p}$ and other elements in $Eq=[E_{q,1}, E_{q,2}, \ldots, E_{q,n}]$, assume that P1, P2, . . . , Pn are respectively the key testing positions corresponding to the transmitting antennas Tx1, Tx2, . . . , Txn, the value of $E_{i,p}$ represents the field strength of the pth transmitting antenna at the key testing position i, which is recorded as $W_p=E_{i,p}$, and the field strengths generated by transmitting antennas corresponding to the n key testing positions are recorded as $\vec{W} = [W_1, W_2, \ldots, W_n]$;

step (3.3): the signal strength $\vec{W}$ at n key testing positions is calculated via simulation in the correction step (3.2), and the correction process is to correct the signal strength at n key testing positions calculated via simulation according to the technical standards of the networks (GSM、CDMA、WCDMA、TD-SCDMA、TD-LTE, etc.), the ratio of the reference signal power in the total power that is set in the networks, and the gain of the receive antenna of the dial testing mobile phones, storing the correction results as the reference signal strength that can be received by the mobile phones at the key testing positions.

For example: if WCDMA technical standard is applied to the indoor wireless networks, the network reference signal (pilot signal) power takes 10% of the total signal power, and the receiver gain is 3 dBi, then the field strength of the reference signal received by mobile phones is $\vec{W}' = \vec{W} - 10$ dB+3 dB When information of the transmitting antenna changes within a region, it is necessary to recalculate the field strength generated by the transmitting antennas in the three-dimensional space according to step (2), recalculate the key testing positions of each of the transmitting antennas according to step (3), and recalculate and store the reference signal strength received by the mobile phones at the key testing positions. The changes of the information of the transmitting antennas includes: adjustments to the transmitting antenna parameters, alternation of locations of the transmitting antennas or increases in number of the transmitting antennas.

The mobile phones in step (4), having an timing automatic dial testing function which is customized by the mobile phone manufacturer, may be supplied with electric power by connecting to wired power supply;

the user-defined settings in the step (4) is based on the distribution diagram of the telephone traffic in the target building over time, the automatic dial testing time is set when the networks are idle, the automatic dial testing frequency is set as once per day or a plurality of times per day, the target objects of dial testing are other testing mobile phones or internet servers, the business of dial testing is language business, data business or a combination of a plurality kinds of businesses. The type of dial testing may be speech, data or a combination of a plurality of speech and data.

The step (6) comprises the steps: judging the transmitting antenna with faults according to the on-states of n dial testing mobile phones corresponding to n key testing positions extracted in step (5), the reference signal strength information in the measurement reports, and the strength information $\vec{w}'$ of the reference signal received by the mobile phones at the testing positions stored in step (3.3), assume that the reference signal strength information of n dial testing mobile phones in the measurement reports is recorded as $\vec{Me} = [Me_1, Me_2, \ldots, Me_n]$, then the reference signal strength information received by the mobile phones in normal situations at n key testing positions is recorded as $\vec{w}' = [W'_1, W'_2, \ldots, W'_n]$, calculate the value of $\Delta_p = |Me_p - W'_p|$, 1≤p≤n, wherein, $\Delta p$ represents the difference value between the reference signal strength information $Me_p$ actually measured by the dial testing mobile phones and the reference signal strength information $W'p$ theoretically received by the dial testing mobile phones, at a key testing position p; the transmitting antenna Txp corresponding to the dial testing mobile phone p is considered to have faults if $\Delta p$ exceeds a certain threshold value $\Delta$ for H times consecutively and/or the mobile phone p has problems in getting through for I times consecutively.

The number of times H that $\Delta p$ exceeds the threshold, the number of times I that the mobile phone has problems in getting through and the threshold $\Delta$ can all be set by oneself according to the requirements to the indoor wireless networks of the scene, the fluctuation situation of $\vec{w}'$ and how difficult the inspection and maintenance of the scene is.

The advantageous effects of this invention:

1. This method demands neither the network maintenance staff to measure on site, nor to construct additional wireless networks, but requires only to deploy dial testing mobile phones at the key testing positions of the indoor wireless networks, and the location where a fault occurs can be accurately positioned by analyzing the on-states and measurement reports of the dial testing mobile phones. Comparing with traditional methods of positioning and detecting network faults, this method saves more human costs and resource costs.

2. The method of obtaining the signal strength of the target building in step (1) and step (2) applies the ray-tracing propagation model to predict via simulation, this method is advantageous in establish field strengths in that the establishment process is rapid while the result is accurate.

3. The selection of key testing positions of the antennas in step (3) is based on the signal strength predicted in step (2), therefore when the signal strength changes, the key testing positions of the antennas should also change accordingly, in general, slightly changes of the antenna parameter do not require to recalculate key testing positions, but require only subtle corrections and adjustments to the reference signal strength received by the mobile phones at the key testing positions.

4. The autonomous detecting method of network faults proposed in this invention can discover network faults and replace the wireless network devices of similar index in time, reducing to a largest extent the influences of faults of the room separator upon the performance of indoor wireless networks. And the method herein can continue to be used to perform autonomous detecting and positioning of network faults without recalculating key testing positions and the reference signal strength received by the mobile phones at the key testing positions after replacing the wireless network devices with similar index.

DETAILED DESCRIPTION OF THE INVENTION

The present invention will be further described in combination with the figures and embodiment.

An autonomous detecting and positioning method of indoor wireless network faults of this invention is applied to autonomously detect and position the faults of the WCDMA indoor wireless network in a target building of 5 floors (the floorage of each floor is 600 m$^2$). The WCDMA indoor wireless networks in the target building belong to a same cell, and have 15 indoor wireless network transmitting antennas in total, 3 for each floor, which are arranged above the 2.4 meters high ceilings.

The technical solution this invention is not limited to WCDMA networks, but can also be applied to one or a combination of multiple other wireless communication networks (wireless wide area network and wireless local network).

Figure 1:
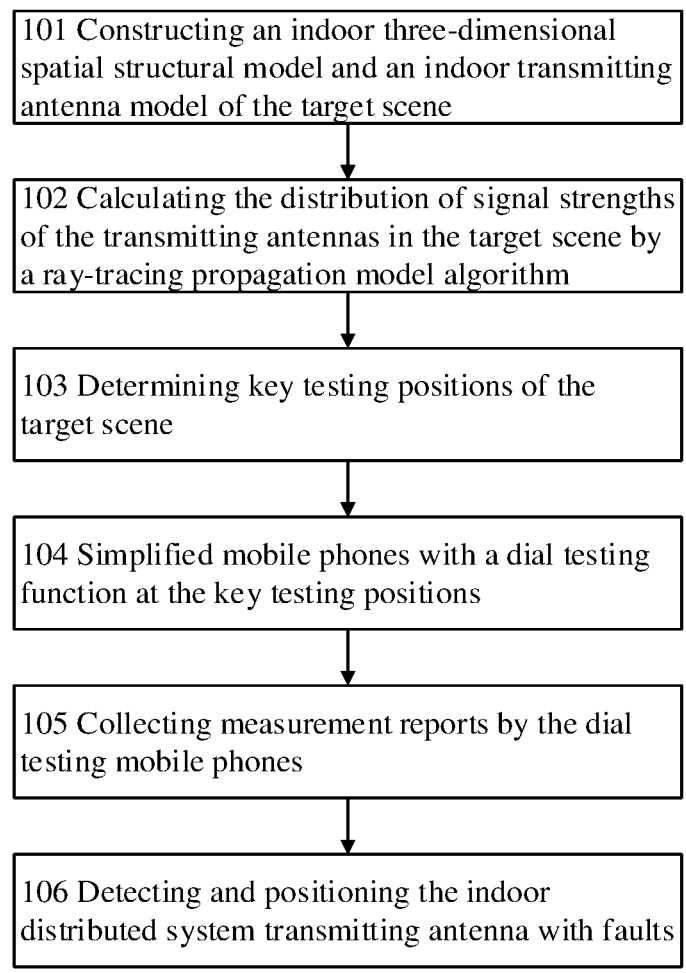
FIG. 1 is the autonomous detecting and positioning method of indoor wireless network faults proposed in the present invention.
Figure 2:
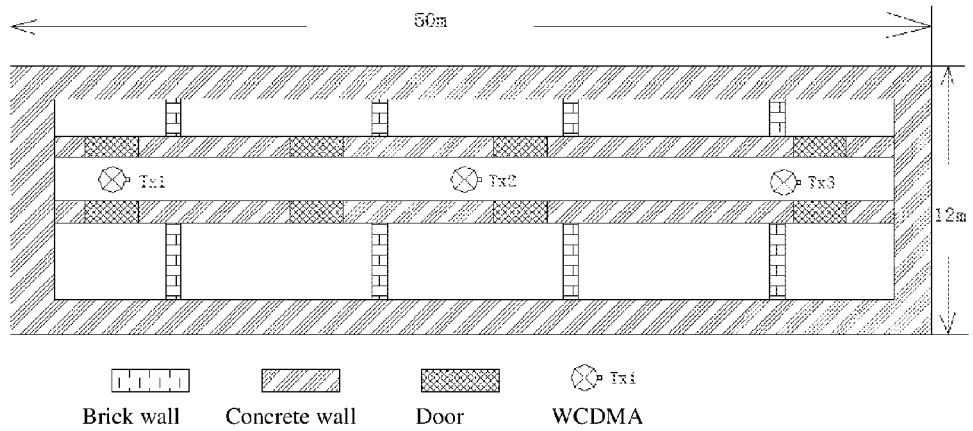
FIG. 2 shows the three-dimensional spatial structural model of a target building and the positions of the indoor transmitting antennas.

As shown in FIG. 1, a method of rapidly establishing fingerprint database of indoor wireless signals comprises the following steps:

(1): 101—building an indoor three-dimensional spatial structural model and an indoor transmitting antenna model of a target building. Building the indoor three-dimensional spatial structural model of the target building comprises: three-dimensional modeling the CAD format drawings of the target building for each floor respectively, according to the CAD format drawings of the target building and the existing modeling technology, storing separately the three-dimensional spatial construction data of each floor; the three-dimensional construction data in this embodiment includes: the vertical height of a floor is 3 meters, the horizontal area of a floor is 600 m$^2$, the building materials of the floors include brick wall, concrete wall and wooden doors, the layout of the floors is shown in FIG. 2. The transmitting antenna model in this embodiment includes: the horizontal position of the transmitting antennas is shown in FIG. 2, the transmitting antennas are positioned above the ceiling of a vertical height of 2.4 meters, the transmitting antennas (Tx1, Tx2, Tx3) are 3 dBi omnidirectional antennas, the transmitting power of the transmitting antenna is 20 dBm, the signal frequency of the transmitting antenna is 2100 MHz, and the down tilt angle of the transmitting antenna is 5 degrees. FIG. 2 shows the plane structure of the three-dimensional spatial model of the first floor of the target building according to the CAD drawings thereof, and the positions of WCDMA indoor wireless network transmitting antennas in the plane diagram.

(2): 102—calculating, in the indoor three-dimensional spatial structural model, the signal strength of the transmitting antenna in step (1) inside the target building by using a ray-tracing propagation model algorithm; the calculation process via simulation includes simulating respectively the signal strength of each of the transmitting antennas in the target building, the specific procedure is shown in steps (2-1) to (2-8).

Figure 3:
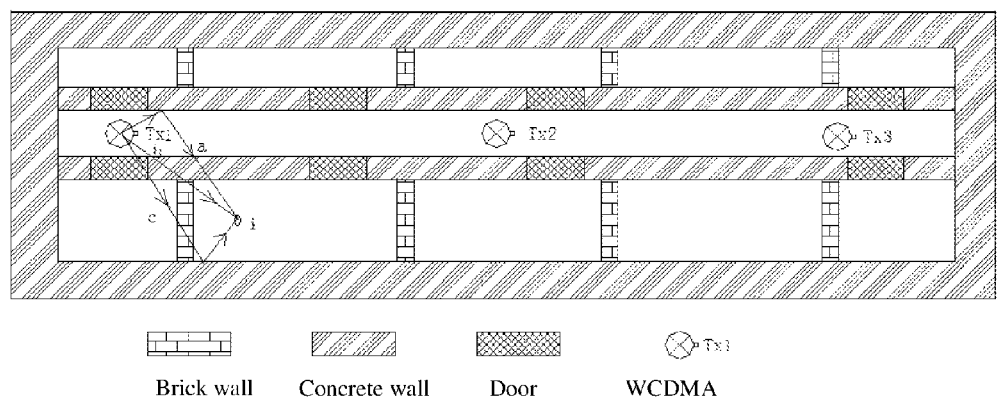
FIG. 3 is a diagram of three propagation paths of the ray emitted by a left WCDMA antenna that can be received at point i.

Predicting the signal strength of one transmitting antenna received at a receive point inside the target building by using the ray-tracing propagation model algorithm, the specific procedure is shown in (2-1)-(2-6):

(2-1): according to positions of the left WCDMA wireless transmitting antenna (Tx1) in the indoor wireless networks and the receive point i, determining all propagation paths of the rays emitted from the left WCDMA wireless transmitting antenna of the indoor wireless networks to the receive point i, the propagation paths comprising: N=3 ray propagation paths, ray path a, ray path b and ray path c; as shown in FIG. 3.

Wherein, ray path a reaches the receive point i after being reflected by and penetrate the concrete walls; ray path b reaches the receive point i after penetrating the concrete walls and brick walls; ray path c reaches the receive point i after penetrating the wooden doors and brick walls, and reflected by the concrete walls;

(2-2): calculating the propagation loss of each of the propagation paths in the free space, and the path lengths of the above ray path a, ray path b and ray path c are respectively 6.6 meters, 5.2 meters and 7.1 meters, the transmitting frequency of the wireless signal is 2.1 GHz;

wherein the value of propagation loss of the kth path in the free space is $L_p(f, d_k)$ ($1 \le k \le 3$), f is the wireless signal frequency (MHz), $d_k$ is the transmission distance (km) of the kth path in the free space; then the loss value of the kth path in the free space, regardless of transmission, reflection and diffraction, is calculated by the following formula:

$$L_p(f, d_k) = 20 \log 10(f) + 20 \log 10(d_k) + 32.45$$

According to this formula, the loss values of the above three ray paths a, b and c in the free space are respectively calculated as 55.29 dB, 53.21 dB and 55.92 dB.

(2-3): calculating the loss of each ray path under the influence of building materials, wherein $L_{MAT}(f)$ represents the total fading of the transmissions, reflections and diffractions caused by the building materials on the kth path; T is the total number of all building materials in the target building, and the jth material is represented as $M_j$ ($1 \le j \le T$), $\delta t$, $\delta d$, $\delta r$ respectively represent the correlation coefficients of whether there is transmission, reflection or diffraction between the wireless signals on the kth path and the building materials, $$\delta_t = \begin{cases} 0, & \text{transmission of material } M_j \text{ does not exist} \\ 1, & \text{transmission of material } M_j \text{ exists} \end{cases}$$

$$\delta_d = \begin{cases} 0, & \text{diffraction of material } M_j \text{ does not exist} \\ 1, & \text{diffraction of material } M_j \text{ exists} \end{cases}$$

-continued $$\delta_r = \begin{cases} 0, & \text{reflection of material } M_j \text{ does not exist} \\ 1, & \text{reflection of material } M_j \text{ exists} \end{cases}$$

in the database of parameters of wireless propagation loss of the building materials, $L_t(f,M_j)$, $L_d(f,M_j)$, $L_r(f,M_j)$ are respectively: the loss parameters of the transmission, diffraction and reflection of the frequency corresponding to material $M_j$, when the wireless signal frequency is f; then the total fading $L_{MAT}(f)$ of the transmissions, diffractions and reflections caused by building materials on the kth path is calculated by the following formula:

$$L_{MAT}(f) = \sum_{j=1}^{T} (\delta t * L_t(f, M_j) + \delta d * L_d(f, M_j) + \delta r * L_r(f, M_j))$$

According to the database of the wireless propagation loss parameters of the building materials, when the frequency of wireless signal is 2.1 GHz, the transmission loss of brick walls, concrete walls and wooden doors are respectively 6.77 dB, 20.25 dB and 4.44 dB, the reflection loss of concrete walls is 6 dB, and according to the formula $$L_{MAT}(f) = \sum_{j=1}^{T} (\delta t * L_t(f, M_j) + \delta d * L_d(f, M_j) + \delta r * L_r(f, M_j))$$

the loss of path a equals to the reflection loss plus the transmission loss of the concrete walls; the loss of path b equals to the transmission loss of the concrete walls plus that of the brick walls; the loss of path c equals to the transmission losses of the wooden doors and the brick walls plus the reflection loss of the concrete walls; the losses of the above three ray paths a, b and c under the influence of building materials are calculated respectively as: 26.25 dB, 27.02 dB and 17.21 dB;

(2-4): calculating the propagation loss $L(f,d_k)$ of each propagation path by the following formula:

$$L(f,d_k) = L_p(f,d_k) + L_{MAT}(f)$$

According to this formula, the propagation losses $L(f,d_k)$ of the above three ray paths a, b and c to the receive point i are calculated as 81.54 dB、80.23 dB、73.13 dB.

(2-5): calculating the total loss PL(dB) of the N=3 ray propagation paths to the ith point; since the energy of each ray propagation path is in linear relationship, the calculation of losses of a plurality of propagation paths can start from the superposition of the energy (mW) of each ray, followed by taking average and transforming the energy value into path loss value; the calculation formula of PL is as follow:

$$PL = 10 lg \left( \frac{1}{N} \sum_{k=1}^{N} \left( 10^{\frac{L(f,d_k)}{10}} \right) \right).$$

The total losses of the above three ray paths is calculated and obtained: PL=79.52 dB.

(2-6): calculating the wireless signal strength at the receive point i, assume that $P_i$ is the signal strength (dBm) at the ith receive point; $P_t$ is the transmitting power (dBm) of the wireless signal transmitting antenna; $G_t$ and $G_r$ are respectively the antenna gains (dBi) of the wireless signal transmitting antenna and the receive point, then the signal strength $P_i$ at the ith receive point is calculated by the following formula:

$$P_i = P_t - PL + G_t + G_r.$$

Since step (1) records that the antenna gains of the wireless transmitting antennas and the receive point i are all 3 dBi, the transmitting power of the wireless transmitting antenna is 20 dBm, therefore the wireless signal strength $P_i$ at the receive point i is calculated as $P_i=-53.52$ dBm according to this formula;

(2-7): selecting all other receive points in the scene, repeating step (2-1) to step (2-6) to obtain the wireless signal strength of one transmitting antenna at all receive points.

(2-8): selecting other transmitting antennas of the indoor wireless network, repeating step (2-1) to step (2-7) to obtain the strength information of wireless signal of each wireless transmitting antenna in the scene.

(3): 103—determining key testing positions of the target buildings according to the simulation results in step (2). The method of determining the key testing positions of the target building comprises the following steps:

(3.1): as regards the simulation results in step (2), selecting a plane at the same height with the transmitting antennas from the floors, which is 2.4 meters in this embodiment, selecting accordingly the height of 2.4 meters as the sampling plane and sampling respectively, by a resolution of 1 meter, the field strength generated by 15 transmitting antennas in this embodiment, since the floorage of each floor of the scene is 600 m², and the overall floorage is 3000 m², therefore the number of sampling points of the scene is 3000, and the sampling result can be stored as a two-dimensional array of 3000×15 (3000 lines and 15 columns), wherein each line of data thereof records the field strengths of 15 transmitting antennas at one position, the field strength of the 15 transmitting antennas at the ith position is recorded as $\vec{E_i} = [E_{i,1}, E_{i,2}, \ldots, E_{i,15}]$, (1≤i≤3000), each column of data records the field strength of one transmitting antenna at the 3000 positions of the samples, the field strength of the pth transmitting antenna respectively at the 3000 positions is recorded as $$[E_{1,p}, E_{2,p}, \ldots, E_{3000,p}]^T, (1 \le p \le 15).$$

Figure 4:
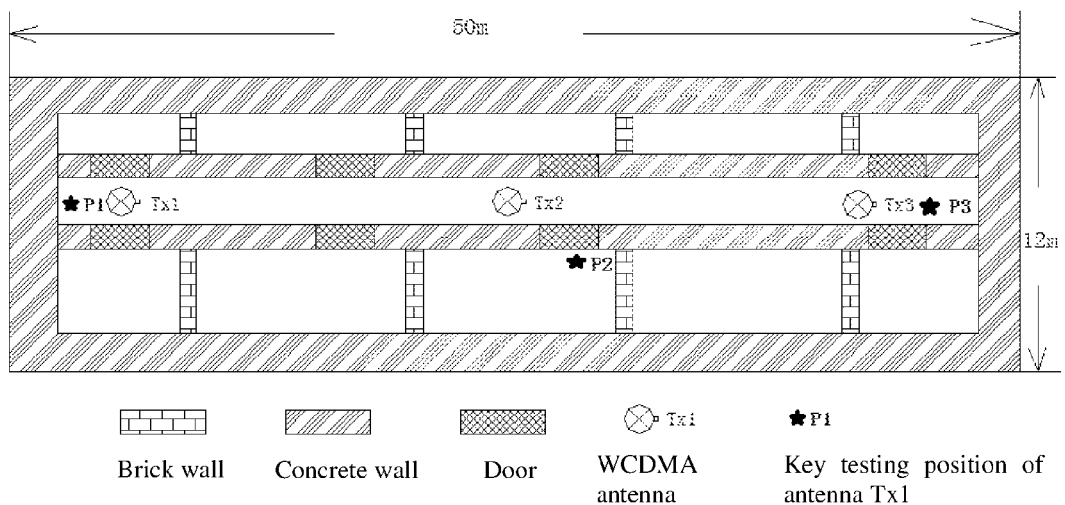
FIG. 4 is a distribution diagram of the key testing positions of the three transmitting antennas on the first floor of the building.

(3.2): processing the data in the stored sampling results in step (3.1), searching n key testing positions from m positions, each of which corresponds to a transmitting antenna, the basis of searching key testing positions is to ensure that the difference between the signal strength generated by the transmitting antenna corresponding to a key testing position and that generated by other antennas is the biggest, assume that i position is the key testing position of the pth transmitting antenna, then, for any other positions q1≤q≤3000, q≠i, there is:

$$\min\{|E_{i,1}-E_{i,p}|, |E_{i,2}-E_{i,p}|, \ldots, |E_{i,15}-E_{i,p}|\} > \min\{|E_{q,1}-E_{q,p}|, |E_{q,2}-E_{q,p}|, \ldots, |E_{q,15}-E_{q,p}|\}$$

that is, the minimum value of the difference between element $E_{i,p}$ and other elements in $\vec{E_i} = [E_{i,1}, E_{i,2}, \ldots, E_{i,15}]$ is larger than that between $E_{q,p}$ and other elements in $\vec{E_q} = [E_{q,1}, E_{q,2}, \ldots, E_{q,15}]$. As shown in FIG. 4, P1, P2 and P3 are key testing positions respectively correspond to the 3 transmitting antennas Tx1, Tx2 and Tx3 on the first floor of the building, the value of element $E_{i,p}$ is recorded as the signal strength of the pth transmitting antenna at the key testing position i, which is recorded as: $W_p=E_{i,p}$, the field strengths of the transmitting antennas at 15 key testing positions are recorded as $\overline{W} = [W_1, W_2, \ldots, W_{15}]$.

(3.3): correcting the signal strengths $\overline{W}$ at 15 key testing positions that are calculated via simulation in step (3.2), since WCDMA technical standard is applied to the indoor wireless networks, the power of network reference signal (pilot signal) takes 10% of the total signal power, and the receiver gain is 3 dBi, then the field strength of the reference signal received by the mobile phones is $\overline{w}' = \overline{W} -10$ dB+3 dB.

(4): 104—deploying simplified mobile phones with dial testing function at the 15 determined key testing positions in step (3), the mobile phones having the timing autonomous dial testing function which may be customized by the mobile phone manufacturer are supplied with electric power by a wired power supply, the timing autonomous dial testing function includes that the user can define the automatic dial testing time, frequency, target object and service type, the basis of the user-defined settings is the distribution diagram of the telephone traffic in the target building over time, the automatic dial testing time is set when the networks are idle, the automatic dial testing frequency is set as once per day or a plurality of times per day, the target objects of dial testing are other testing mobile phones or Internet servers, the service type of dial testing is voice call, data connection or a combination of a plurality kinds of services. In other words the dial testing may use speech-type traffic, data-type traffic or a combination of a plurality of traffic types. The timing automatic dial testing function may be that the mobile phone has a timer for initiating the autonomous dial testing function. In this embodiment, according to the statistical diagram of the telephone traffic in the building, the lowest telephone traffic appears in 3 o'clock in the morning, and the automatic dial testing frequency is set as once per day at 3 o'clock am, and the automatic dial testing function of the 15 dial testing mobile phones is activated in order and respectively to dial voice calls to a certain testing mobile phone.

(5): 105—on network side, judging on-states of the dial testing mobile phones, collecting measurement reports on the mobile phones, and extracting respectively the measurement reports of the dial testing mobile phones that correspond to the 15 transmitting antenna, according to the dial testing time set in step (4), the indications of the cell where the indoor wireless networks locate and the indications of the dial testing mobile phones.

(6): 106—judging the transmitting antennas with faults according to the on-states of 15 dial testing mobile phones extracted in step (5), the reference signal strength information in the measurement reports, and the reference signal strength information $\overline{w}'$ received by the mobile phones at the key testing positions stored in step (3.3), assume that the reference signal strength information of 15 dial testing mobile phones in the measurement reports is recorded as $\overline{M} = [Me_1, Me_2, \ldots, Me_{15}]$, then the reference signal strength information received by the mobile phones in normal situations at 15 key testing positions is recorded as $\overline{w}' = [W'_1, W'_2, \ldots, W'_{15}]$, calculate the value of $\Delta_p = |Me_p - W'_p|$, ($1 \le p \le 15$), the transmitting antenna Txp corresponding to the dial testing mobile phone p is considered to have faults if $\Delta p$ exceeds a certain threshold value $\Delta$ for H times consecutively and/or the mobile phone p has problems in getting through for I times consecutively. Preferably, the present invention applies the threshold of $\Delta = 7$ dB, H=5, I=3, that is, the dial testing mobile phone is considered to have faults when $\Delta p$ exceeds a certain threshold value $\Delta$ for 5 times consecutively and/or the mobile phone p has problems in getting through for 3 times consecutively.

Although the aforementioned content has described the specific embodiment in combination with the figures, it does not limit the protection scope of this invention, and it shall be understood by a persons skilled in the art that, on the basis of the technical solution of this invention, various kinds of amendments or alternations that can be made without paying any creative efforts are still within the protection scope of the present invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for autonomous detecting and positioning of indoor wireless network faults of one or more wireless networks, the method comprising:
    building an indoor three-dimensional spatial structural model and an indoor transmitting antenna model of a target building,
    calculating, in the indoor three-dimensional spatial structural model, a signal strength of the indoor transmitting antenna model inside the target building according to a ray-tracing propagation model algorithm to accordingly determine one or more key testing positions of the target building,
    deploying one or more connection testing wireless units, each connection testing wireless unit having an automatic connection testing function, at the key testing positions of indoor wireless networks and starting the connection testing wireless units when the one or more wireless networks are idle,
    counting on-states of the connection testing wireless units, collecting measurement reports reported by the connection testing wireless units, and determining the indoor wireless network faults of the one or more wireless networks and associated devices according to the on-states of the connection testing wireless units and the measurement reports reported by the connection testing wireless units.

2. The method for autonomous detecting and positioning of indoor wireless network faults according to claim 1, wherein the one or more connection testing wireless units with the automatic connection testing function include at least one mobile phone with an automatic dial testing function.

3. The method for autonomous detecting and positioning of indoor wireless network faults according to claim 1, wherein the automatic connection testing function is an automatic network service request function.

4. The method for autonomous detecting and positioning of indoor wireless network faults according to claim 1, wherein the connection testing wireless units are cellular devices.

5. A method for autonomous detecting and positioning of indoor wireless network faults, the method comprising:

building an indoor three-dimensional spatial structural model and an indoor transmitting antenna model of a target building;

calculating a signal strength of the indoor transmitting antenna model inside the target building in step (1) by using a ray-tracing propagation model algorithm on the indoor three-dimensional spatial structural model;

determining key testing positions of the target building and a reference signal strength that can be received by one or more wireless units at the key testing positions, according to calculation results;

deploying the one or more wireless units with a timer to initiate an automatic connection testing function at the key testing positions determined; the automatic connection testing function includes one or more of a customizable testing time, frequency, target and service type of the one or more wireless units;

on a network side, determining on-states of the one or more wireless units, collecting measurement reports reported by the wireless units, respectively extracting the measurement reports of the wireless units that correspond to one or more transmitting antennas, according to the automatic testing function and labelling the one or more wireless units;

determining which of the one or more transmitting antennas have a fault according to the on-states of the one or more wireless units determined, the reference signal strength information in at least one of the measurement reports, and the reference signal strength that can be received by the one or more wireless units at the key testing positions.

6. The method for autonomous detecting and positioning of indoor wireless network faults according to claim 5, wherein building the indoor three-dimensional spatial structural model includes three-dimensional modeling CAD format drawings of the target building for each floor of the target building, and storing separately data representing the three-dimensional spatial structural model of each floor; the data representing the three-dimensional spatial structural model includes vertical heights of each floor, horizontal areas of each floor, data of building materials and data of a layout and structures of the floors each floor.

7. The method for autonomous detecting and positioning of indoor wireless network faults according to claim 5, wherein building the indoor transmitting antenna model includes recording and storing data of the one or more transmitting antennas in the target building; the data of the one or more transmitting antennas includes information of specific locations of the transmitting antennas inside the target building and three-dimensional radiation parameters, power, frequency and downtilt of the transmitting antennas.

8. The method for autonomous detecting and positioning of indoor wireless network faults according to claim 5, wherein when information of the one or more transmitting antennas within a region changes, recalculating field strengths of the transmitting antennas generated in the three-dimensional spatial structural model, recalculating the key testing positions of each of the one or more transmitting antennas, and recalculating and storing a reference signal strength received by the one or more wireless units at the key testing positions, and wherein the changes of the information of the transmitting includes: adjustments to transmitting antenna parameters, alternations of locations of the transmitting antennas, or an increase in a number of transmitting antennas.

9. The method for autonomous detecting and positioning of indoor wireless network faults according to claim 5, wherein
the one or more wireless units are supplied with electric power by connecting to a wired power supply.

10. The method for autonomous detecting and positioning of indoor wireless network faults according to claim 5 wherein:
the automatic connection testing function is based on a distribution diagram of telephone traffic in the target building over time, the customizable testing time is set when the networks are idle, the frequency is set as once per day or a plurality of times per day, target objects of connection testing are other testing wireless units or internet servers, and the service type of connection testing are voice call, data connection or a combination of a plurality of services.

* * * * *